Patented May 15, 1951

2,553,022

UNITED STATES PATENT OFFICE 2,553,022

PREPARATION OF CYANOACETYL UREAS

Vernon H. Wallingford, Ferguson, and David M. Jones, Webster Groves, Mo., assignors to Mallinckrodt Chemical Works, St. Louis, Mo., a corporation of Missouri No Drawing. Application January 17, 1947, Serial No. 722,750

12 Claims. (Cl. 260—465.4)

This invention relates to ureas and more particularly to methods for the preparation of cyanoacetyl ureas.

Among the objects of this invention are the provision of methods for preparing cyanoacetyl ureas from commercially available materials; the provision of methods of the type indicated which utilize salt mixtures which may be the product of commercial processes; the provision of methods of the type indicated which may be easily carried out without the necessity for previously isolating the reactants; and the provision of methods of the type referred to which may be easily carried out with commercially available reactants to afford an excellent yield of the desired product. Other objects will be in part apparent and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Heretofore, cyanoacetyl ureas have been prepared by reacting cyanoacetic acid with a urea in the presence of acetic anhydride. The reaction is straightforward and gives good yields of the cyanoacetyl urea, but it has been considered necessary to carry it out with substantially pure anhydrous cyanoacetic acid and substantially pure anhydrous urea as starting materials.

The preparation of substantially pure anhydrous cyanoacetic acid is well-known. An alkali cyanide is condensed with an alkali chloroacetate in aqueous solution, the solution is acidified to liberate the acid and evaporated to dryness, and the cyano acid is separated from the alkali chloride by solvent extraction and recovered from the solvent by crystallization, separation and drying. As can be seen, several process steps are required to isolate cyanoacetic acid free from inorganic salts.

Similarly, a urea, for example anhydrous dimethyl urea, can be prepared substantially free of inorganic impurities by reaction of phosgene with methyl amine in the presence of alkali, evaporation of a neutral solution to dryness and solvent extraction of the dimethyl urea followed by crystallization and drying. As can be seen, several process steps are necessary to isolate the urea substantially free of inorganic components.

It has now been found that the expensive and time-consuming steps of purification of the cyanoacetic acid and the urea can be completely eliminated with beneficial results to process simplicity, operating economy, and cost of materials. Moreover, not only is a purified cyanoacetic acid unnecessary, but it is not even necessary to use entirely cyanoacetic acid, a mixture of an alkali cyanoacetate such as sodium cyanoacetate and cyanoacetic acid giving as good results as the acid alone, and having certain advantages.

In practice of the preferred embodiment of this invention, sodium cyanoacetate, prepared, for example, from sodium cyanide and sodium chloroacetate, is neutralized in whole or in part with mineral acid. Equivalent dimethyl urea in aqueous solution prepared, for example, by reaction of phosgene with methyl amine, is then added and the combined solutions are evaporated to a practically anhydrous liquid melt which is completely satisfactory for carrying out the cyanoacetylation. This is accomplished by adding acetic anhydride and stirring at moderate temperatures for a short time.

Among the advantages of this procedure are: (1) the complete elimination of solvent purifications of dimethyl urea and cyanoacetic acid which saves both time and materials; (2) the simplicity of the equipment required and the minimum of hazardous operations; (3) the elimination of the necessity of handling solids; and (4) the provision for the more economical handling of all reactants in liquid form. Not only is the production cycle materially shortened, but production time is greatly reduced, thus effecting desirable economies in the commercial manufacture of these materials.

It has also been found that in lieu of the urea-salt mixture, a pure urea may be substituted, and in lieu of the alkali cyanoacetate-salt mixture, pure sodium cyanoacetate may be employed. Also, the reaction may be carried out with cyanoacetic acid and a urea-salt mixture.

The resulting cyanoacetyl urea is eminently suited for ring closure with an alkali to form a 4-aminouracil, which in turn may be reacted with sodium nitrite and acetic acid in the customary way to form the corresponding 5-nitroso compound. This may be carried out without isolating either the cyanoacetyl urea or the uracil formed therefrom.

The following examples illustrate the invention.

*Example 1*

Chloroacetic acid (7.34 pounds) was dissolved in water (1.29 gallons). Sodium carbonate monohydrate (4.80 pounds) was dissolved in water (1.39 gallons). The sodium carbonate solution was added to the chloroacetic acid solution with stirring to form sodium chloroacetate in solution. Sodium cyanide (3.96 pounds) was dissolved in water (0.83 gallon). The sodium chloroacetate solution was added to the sodium cyanide solution with stirring. The mixture was allowed to stand and it warmed by its own heat of reaction to 60° C. in sixteen minutes. Further heat of reaction was controlled by the addition of ice over a period of fourteen minutes so that the maximum temperature was 76.5° C. The mixture was then allowed to cool to 50° C. This resulting solution was transferred to a glass-lined vessel arranged for vacuum distillation and with a stirrer adjusted close to the bottom of the vessel so that it would agitate the final mixture after it had been evaporated down to a small volume.

To the reaction mixture of sodium cyanoacetate in the vessel was then added a solution of 60° Bé. sulfuric acid (0.20 gallon) in water (0.80 gallon), which is approximately 80% of the amount required to liberate the cyanoacetic acid present, and a solution (16.0 pounds) containing 41.5% of dimethyl urea and 12.0% sodium chloride. This mixture was then stirred and vacuum evaporated at 40–50° C. and 40–60 mm. for six hours. At the end of this time the water content of the melt was 3%. To the melt was then added acetic anhydride (1.20 gallons) during one hour at a temperature of 35–45° C. The mixture was further stirred for one hour at 45–55° C. At this point the mixture contained cyanoacetyl dimethyl urea in excellent yield.

The mixture was dissolved in water (5.55 gallons), transferred to a larger container, and 35° Bé. sodium hydroxide (2.24 gallons) was added. The temperature rose from 30 to 75° C. during the addition of the alkali and was then raised to 90° C. by injecting live steam. After fifteen minutes at 90° C., there was added acetic acid (0.74 gallon) and this was followed during five minutes by a solution of sodium nitrite (5.41 pounds) in water (0.93 gallon). The temperature was maintained at 70–94° C. for fifteen minutes and then cooled in one-half hour to 20° C. The slurry which resulted was then centrifuged and the solvent was washed with water and dried. The yield of 1,3-dimethyl-4-amino-5-nitrosouracil was 10.36 pounds in a high state of purity.

*Example 2*

The procedure of Example 1 was carried out using approximately the theoretical amount of sulfuric acid required to liberate 100% of theory of the cyanoacetic acid, instead of 80% of theory as in the previous example. The 1,3-dimethyl-4-amino-5-nitrosouracil was obtained in substantially the same yield and high state of purity.

*Example 3*

The procedure of Example 1 was carried out using approximately the theoretical amount of sulfuric acid required to liberate 60% of the cyanoacetic acid, instead of 80% of theory as in Example 1. The 1,3-dimethyl-4-amino-5-nitrosouracil was obtained in substantially the same yield and high state of purity.

*Example 4*

A mixture of sodium cyanoacetate and sodium chloride was prepared by the reaction of sodium cyanide and sodium chloroacetate in water solution. After evaporating to dryness in a vacuum the product was finely ground and was used directly in the following procedure:

In a flask provided with a stirrer was placed the powdered sodium cyanoacetate-sodium chloride mixture (83 g.), acetic anhydride (200 ml.) and urea (50 g.). The mixture was cooled and maintained between 2 and 4° C. while concentrated sulfuric acid (16.5 ml.) was added dropwise during three-quarters of an hour. The flask was then surrounded by a water bath at 70° C. The reaction evolved some heat so that the temperature went spontaneously to 79° C. during five minutes and then slowly dropped. The mixture was held at 70° C. and stirred for one hour and was then cooled to 30° C. and filtered yielding 125 ml. of liquor and 235.5 g. of wet solid. The solid obtained upon filtration was stirred with water (500 ml.) containing cracked ice. The product was then filtered and washed. After drying at 70° C. it weighed 56.0 g. and melted at 204–207° C. Twenty-five grams of this crude product were recrystallized from hot water (350 ml.) yielding 16.5 g. melting point 211–212.5° C., which agrees well with the melting point of cyanoacetyl urea recorded in the literature (209–212° C.). The identity of the product was further confirmed by converting a portion of it to 4-aminouracil by warming it with 30% sodium hydroxide, acidifying with acetic acid and adding sodium sodium nitrite to form the characteristic red compound, 4-amino-5-nitrosouracil.

*Example 5*

A mixture (99 g.) of material consisting of equimolecular portions of sodium cyanoacetate and sodium chloride was used which was obtained by evaporating to dryness the reaction mixture formed in the customary way. This was mixed with pure dimethyl urea (44.5 g.). This mixture was stirred and to it was added a mixture of acetic anhydride (110 ml.) and concentrated sulfuric acid (5 ml.) during a period of one-half hour over a temperature range of 35–53° C. The temperature was then maintained at 50–55° C. for one hour. Then water (250 ml.) was added followed by 35° Bé. sodium hydroxide (185 ml.). The mixture was then heated to 90° C. for ten minutes. Then acetic acid (40 ml.) was added and a solution of sodium nitrite (35 g.) in water (50 ml.) was added in five minutes. The temperature was held at 90–95° C. for fifteen minutes. It was then cooled and the solid, which was 1,3-dimethyl-4-amino-5-nitrosouracil, was filtered off and dried at 70° C. at which time it weighed 81 g.

*Example 6*

The reaction was carried out in the same manner as Example 5 except that the amount of acetic anhydride used in the original condensation was 143 ml. and no sulfuric acid was used. Further, the amount of sodium hydroxide used was 240 ml. The procedure was the same as in Example 5 and the yield of 1,3-dimethyl-4-amino-5-nitrosouracil was 58 g.

*Example 7*

The reaction was carried out in the same manner as Example 5 except that instead of using dimethyl urea alone, there was used a mixture (102 g.) of dimethyl urea and sodium chloride in the molecular proportions of one of the former to two of the latter. This mixture was obtained by the process described in the pending application of August H. Homeyer, Serial No. 710,413, filed November 18, 1946, now Patent No. 2,444,023. The procedure was the same as in Example 5 and the 1,3-dimethyl-4-amino-5-nitrosouracil was obtained in substantially the same yield.

*Example 8*

Cyanoacetic acid (85 g.) was mixed with 211 g. of a material which consisted of dimethyl urea and sodium chloride in the molecular proportions of one of the former to two of the latter. This mixture was obtained by the process described in the pending application of August H. Homeyer, Serial No. 710,413, filed November 18, 1946. Then acetic anhydride (150 ml.) was added with stirring and the temperature rose rapidly to 80° C. and was held there for one hour. Then water (500 ml.) was added followed by 35° Bé. sodium hydroxide (260 ml.). The mixture was then heated to 90° C. for ten minutes. Then acetic acid (89 ml.) was added. Then a solution of sodium nitrite (78 g.) in water (100 ml.) was added in five minutes. The temperature was held at 90° C. for fifteen minutes and then cooled and the solid was filtered off and dried at 70° C. The solid, which was 1,3-dimethyl-4-amino-5-nitrosouracil, weighed 143 g.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of making a cyanoacetyl urea which comprises mixing under substantially anhydrous conditions acetic anhydride, an alkali cyanoacetate and a urea.

2. The method which comprises mixing under substantially anhydrous conditions acetic anhydride, an alkali cyanoacetate, cyanoacetic acid, and a urea, to form a cyanoacetyl urea.

3. The method which comprises mixing under substantially anhydrous conditions acetic anhydride, an alkali cyanoacetate, a urea, and a mineral acid in a proportion that will convert a portion of said cyanoacetate to cyanoacetic acid, and reacting the mixture to form a cyanoacetyl urea.

4. The method which comprises mixing under substantially anhydrous conditions acetic anhydride, sodium cyanoacetate, and dimethyl urea, and adding sulfuric acid in a proportion that will convert a portion of said acetate to cyanoacetic acid, to form cyanoacetyl dimethyl urea.

5. The method which comprises forming an aqueous solution of an alkali cyanoacetate, adding a urea, evaporating substantially all of the water from the urea containing mixture, and thereafter intermixing acetic anhydride with the dry mixture, to form a cyanoacetyl urea.

6. The method which comprises forming an alkali cyanoacetate and cyanoacetic acid in an aqueous medium, adding a urea to the aqueous mixture, evaporating said aqueous mixture and urea to substantial dryness, and thereafter intermixing acetic anhydride with the dry mixture, to form a cyanoacetyl urea.

7. The method which comprises forming an alkali cyanoacetate in an aqueous medium, adding a mineral acid in a proportion sufficient to convert a portion of said cyanoacetate to cyanoacetic acid, adding a urea, evaporating said aqueous mixture and urea to substantial dryness, and thereafter intermixing acetic anhydride with the dry mixture, to form a cyanoacetyl urea.

8. The method which comprises forming sodium cyanoacetate in an aqueous medium, adding sulfuric acid in a proportion that will convert a portion of said acetate to cyanoacetic acid, adding dimethyl urea to the resulting aqueous reaction mixture, evaporating said aqueous mixture and dimethyl urea to substantial dryness, and intermixing acetic anhydride with the dry mixture to form cyanoacetyl dimethyl urea.

9. The method which comprises mixing an alkali cyanide and a chloroacetate in an aqueous reaction medium with a urea, evaporating the resulting reaction products to a substantially anhydrous melt, and contacting said melt with acetic anhydride, to form a cyanoacetyl urea.

10. The method which comprises mixing the reaction products of an alkali cyanide and an alkali chloroacetate with a urea, adding a mineral acid to said aqueous mixture in a proportion sufficient to convert a portion of the cyanoacetate present therein to cyanoacetic acid, evaporating the resulting aqueous mixture to a substantially anhydrous melt, and contacting said melt with acetic anhydride to form a cyanoacetyl urea.

11. The method which comprises mixing the reaction products of an alkali cyanide and an alkali chloroacetate with a urea, evaporating the resulting aqueous mixture to a substantially anhydrous melt, contacting said melt with acetic anhydride to form a cyanoacetyl urea, and adding an alkali to convert the cyanoacetyl urea to a uracil.

12. The method which comprises mixing the reaction products of sodium cyanide and sodium chloroacetate with dimethyl urea, adding sulfuric acid to said aqueous mixture in a proportion sufficient to convert a portion of the sodium cyanoacetate present therein to cyanoacetic acid, evaporating the resulting aqueous mixture directly and without interruption to a substantially anhydrous melt, and contacting said melt with acetic anhydride to form cyanoacetyl dimethyl urea.

VERNON H. WALLINGFORD.
DAVID M. JONES.

REFERENCES CITED

The following references are of record in the file of this patent:

FOREIGN PATENTS

| Number | Country | Date |
|---|---|---|
| 175,415 | Germany | Feb. 18, 1905 |
| 182,559 | Germany | June 10, 1905 |

OTHER REFERENCES

Traube: Berichte, vol. 33, pp. 1380–1382 (1900).
Baum: Ber. Deut. Chem. 530–540 (1908).
Johnston et al.: Chemical Reviews, vol. 13, October 1933, p. 262.